(12) United States Patent
Turner et al.

(10) Patent No.: US 12,460,862 B2
(45) Date of Patent: Nov. 4, 2025

(54) MIXED REFRIGERANT SYSTEM AND METHOD

(71) Applicant: Chart Energy & Chemicals, Inc., Ball Ground, GA (US)

(72) Inventors: Peter J. Turner, The Woodlands, TX (US); Michael Malsam, Sugar Land, TX (US); Douglas A. Ducote, Jr., The Woodlands, TX (US); Timothy P. Gushanas, Pearland, TX (US)

(73) Assignee: Chart Energy & Chemicals, Inc., Ball Ground, GA (US)

( * ) Notice: Subject to any disclaimer, the term of this patent is extended or adjusted under 35 U.S.C. 154(b) by 281 days.

(21) Appl. No.: 18/364,900

(22) Filed: Aug. 3, 2023

(65) Prior Publication Data

US 2023/0375260 A1     Nov. 23, 2023

Related U.S. Application Data

(60) Continuation-in-part of application No. 17/346,623, filed on Jun. 14, 2021, now Pat. No. 11,732,962, which is a division of application No. 16/138,236, filed on Sep. 21, 2018, now Pat. No. 11,187,457.

(60) Provisional application No. 62/561,417, filed on Sep. 21, 2017.

(51) Int. Cl.
    *F25J 1/00*     (2006.01)
    *F25J 1/02*     (2006.01)

(52) U.S. Cl.
    CPC .......... *F25J 1/0052* (2013.01); *F25J 1/0022* (2013.01); *F25J 1/0055* (2013.01); *F25J 1/0212* (2013.01); *F25J 1/0258* (2013.01); *F25J 1/0262* (2013.01)

(58) Field of Classification Search
    CPC ........ F25J 1/0052; F25J 1/0022; F25J 1/005; F25J 1/0212; F25J 1/0258; F25J 1/0262
    See application file for complete search history.

(56) References Cited

U.S. PATENT DOCUMENTS

2017/0010043 A1     1/2017     Ducote, Jr. et al.

FOREIGN PATENT DOCUMENTS

| CN | 101608860 A | 12/2009 |
|---|---|---|
| CN | 101711335 A | 5/2010 |
| TW | 201200829 A | 1/2012 |
| TW | 201706546 A | 2/2017 |

OTHER PUBLICATIONS

Office Action and English-language machine translation, counterpart Japanese App. No. 2022-183956 (Oct. 31, 2023) (7 pages).
Office Action and Search Report, counterpart Japanese App. No. 2022-183956 (Oct. 31, 2023) (7 pages).

*Primary Examiner* — Elizabeth J Martin
(74) *Attorney, Agent, or Firm* — Cook Alex Ltd.

(57) ABSTRACT

A system for cooling a gas with a mixed refrigerant includes a heat exchanger that receives and cools a feed of the gas so that a product is produced. The system includes a mixed refrigerant processing system having compression devices and aftercoolers as well as a low pressure accumulator and a high pressure accumulator. Liquid from the low pressure accumulator is subcooled, expanded and directed to the primary refrigeration passage. Liquid from the high pressure accumulator is subcooled, expanded and directed to the primary refrigeration passage. Vapor from the high pressure accumulator is liquefied, expanded and directed to the primary refrigeration passage.

23 Claims, 7 Drawing Sheets

MIXED REFRIGERANT SYSTEM AND METHOD

CLAIM OF PRIORITY

This application is a continuation-in-part of U.S. patent application Ser. No. 17/346,623, filed Jun. 14, 2021, which is a division of U.S. patent application Ser. No. 16/138,236, filed Sep. 21, 2018, which claims the benefit of U.S. Provisional Application No. 62/561,417, filed Sep. 21, 2017, the contents of each of which are hereby incorporated by reference.

FIELD OF THE INVENTION

The present invention generally relates to processes and systems for cooling or liquefying gases and, more particularly, to a mixed refrigerant system and method for cooling or liquefying gases.

BACKGROUND

Natural gas, which is primarily methane, and other gases, are liquefied under pressure for storage and transport. The reduction in volume that results from liquefaction permits containers of more practical and economical design to be used. Liquefaction is typically accomplished by chilling the gas through indirect heat exchange by one or more refrigeration cycles. Such refrigeration cycles are costly both in terms equipment cost and operation due to the complexity of the required equipment and the required efficiency of performance of the refrigerant. There is a need, therefore, for gas cooling and liquefaction systems having improved refrigeration efficiency and reduced operating costs with reduced complexity.

Use of a mixed refrigerant in the refrigeration cycle(s) for a liquefaction system increases efficiency in that the warming curve of the refrigerant more closely matches the cooling curve of the gas. The refrigeration cycle for the liquefaction system will typically include a compression system for conditioning or processing the mixed refrigerant. The mixed refrigerant compression system typically includes one or more stages, with each stage including a compressor, a cooler and a separation and liquid accumulator device. Vapor exiting the compressor is cooled in the cooler, and the resulting two-phase or mixed phase stream is directed to the separation and liquid accumulator device, from which vapor and liquid exit for further processing and/or direction to the liquefaction heat exchanger.

Separated liquid and vapor phases of the mixed refrigerant from the compression system may be directed to portions of the heat exchanger to provide more efficient cooling. Examples of such systems are provided in commonly owned U.S. Pat. No. 9,441,877 to Gushanas et al., U.S. Patent Application Publication No. US 2014/0260415 to Ducote et al. and U.S. Patent Application Publication No. US 2016/0298898 to Ducote et al., the contents of each of which are hereby incorporated by reference.

Further increases in cooling efficiency and decreases in operating costs in gas cooling and liquefaction systems are desirable.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a system for cooling a gas with a mixed refrigerant features a heat exchanger including a cooling passage having an inlet configured to receive a feed of the gas and an outlet through which a product exits the heat exchanger. The heat exchanger also includes a primary refrigeration passage, a pre-cool liquid passage, a high pressure vapor passage and a high pressure liquid passage. A first stage compression device has an inlet in fluid communication with an outlet of the primary refrigeration passage. A first stage after-cooler has an inlet in fluid communication with the outlet of the first stage compression device and an outlet. A low pressure accumulator has an inlet in fluid communication with the outlet of the first stage after-cooler and a liquid outlet in fluid communication with the pre-cool liquid passage of the heat exchanger and a vapor outlet. A second stage compression device has an inlet in fluid communication with the vapor outlet of the low pressure accumulator and an outlet. A second stage after-cooler has an inlet in fluid communication with the outlet of the second stage compression device and an outlet. A high pressure accumulator has an inlet in fluid communication with the outlet of the second stage after-cooler and a liquid outlet in fluid communication with the high pressure liquid passage of the heat exchanger and a vapor outlet in fluid communication with the high pressure vapor passage of the heat exchanger. A liquid turbine has a liquid turbine inlet in fluid communication with the high pressure vapor passage of the heat exchanger and a liquid turbine outlet. A middle temperature separation device has an inlet, a vapor outlet in fluid communication with the primary refrigeration passage and a liquid outlet in fluid communication with the primary refrigeration passage. A first expansion device has an inlet in fluid communication with the high pressure liquid passage of the heat exchanger and an outlet in fluid communication with the middle temperature separation device. A second expansion device has an inlet in fluid communication with the pre-cool liquid passage of the heat exchanger and an outlet in fluid communication with the middle temperature separation device. A cold temperature separation device has an inlet in fluid communication with the liquid turbine outlet, a vapor outlet in fluid communication with the primary refrigeration passage and a liquid outlet in fluid communication with the primary refrigeration passage.

In another aspect, a system for cooling a gas with a mixed refrigerant features a heat exchanger including a cooling passage having an inlet configured to receive a feed of the gas and an outlet through which a product exits the heat exchanger. The heat exchanger also includes a primary refrigeration passage, a pre-cool liquid passage, a high pressure vapor passage and a high pressure liquid passage. A first stage compression device has an inlet in fluid communication with an outlet of the primary refrigeration passage. A first stage after-cooler has an inlet in fluid communication with the outlet of the first stage compression device and an outlet. A low pressure accumulator has an inlet in fluid communication with the outlet of the first stage after-cooler and a liquid outlet in fluid communication with the pre-cool liquid passage of the heat exchanger and a vapor outlet. A second stage compression device has an inlet in fluid communication with the vapor outlet of the low pressure accumulator and an outlet. A second stage after-cooler has an inlet in fluid communication with the outlet of the second stage compression device and an outlet. A high pressure accumulator has an inlet in fluid communication with the outlet of the second stage after-cooler and a liquid outlet in fluid communication with the high pressure liquid passage of the heat exchanger and a vapor outlet in fluid communication with the high pressure vapor passage of the heat exchanger. A liquid turbine has a liquid turbine inlet in fluid communication with the high pressure vapor passage of the heat exchanger and a liquid turbine outlet. A middle temperature separation device has an inlet in fluid communication with the pre-cool liquid passage of the heat exchanger, a vapor outlet in fluid communication with the primary refrigeration passage and a liquid outlet in fluid communication with the primary refrigeration passage. A first expansion device has an inlet in fluid communication with the high pressure liquid passage of the heat exchanger and an outlet in fluid communication with the middle temperature separation device. A cold temperature separation device has an inlet in fluid communication with the liquid turbine outlet, a vapor outlet in fluid communication with the primary refrigeration passage and a liquid outlet in fluid communication with the primary refrigeration passage.

In still another aspect, a system for cooling a gas with a mixed refrigerant features a heat exchanger including a cooling passage having an inlet configured to receive a feed of the gas and an outlet through which a product exits the heat exchanger. The heat exchanger also includes a primary refrigeration passage, a pre-cool liquid passage, a high pressure vapor passage and a high pressure liquid passage. A first stage compression device has an inlet in fluid communication with an outlet of the primary refrigeration passage. A first stage after-cooler has an inlet in fluid communication with the outlet of the first stage compression device and an outlet. A low pressure accumulator has an inlet in fluid communication with the outlet of the first stage after-cooler and a liquid outlet in fluid communication with the pre-cool liquid passage of the heat exchanger and a vapor outlet. A second stage compression device has an inlet in fluid communication with the vapor outlet of the low pressure accumulator and an outlet. A second stage after-cooler has an inlet in fluid communication with the outlet of the second stage compression device and an outlet. A high pressure accumulator has an inlet in fluid communication with the outlet of the second stage after-cooler and a liquid outlet in fluid communication with the high pressure liquid passage of the heat exchanger and a vapor outlet in fluid communication with the high pressure vapor passage of the heat exchanger. A middle temperature separation device has an inlet, a vapor outlet in fluid communication with the primary refrigeration passage and a liquid outlet in fluid communication with the primary refrigeration passage. A first expansion device has an inlet in fluid communication with the high pressure liquid passage of the heat exchanger and an outlet in fluid communication with the middle temperature separation device. A second expansion device has an inlet in fluid communication with the pre-cool liquid passage of the heat exchanger and an outlet in fluid communication with the middle temperature separation device. A cold temperature separation device has an inlet in fluid communication with the high pressure vapor passage, a vapor outlet in fluid communication with the primary refrigeration passage and a liquid outlet in fluid communication with the primary refrigeration passage.

DETAILED DESCRIPTION OF EMBODIMENTS

Figure 1:
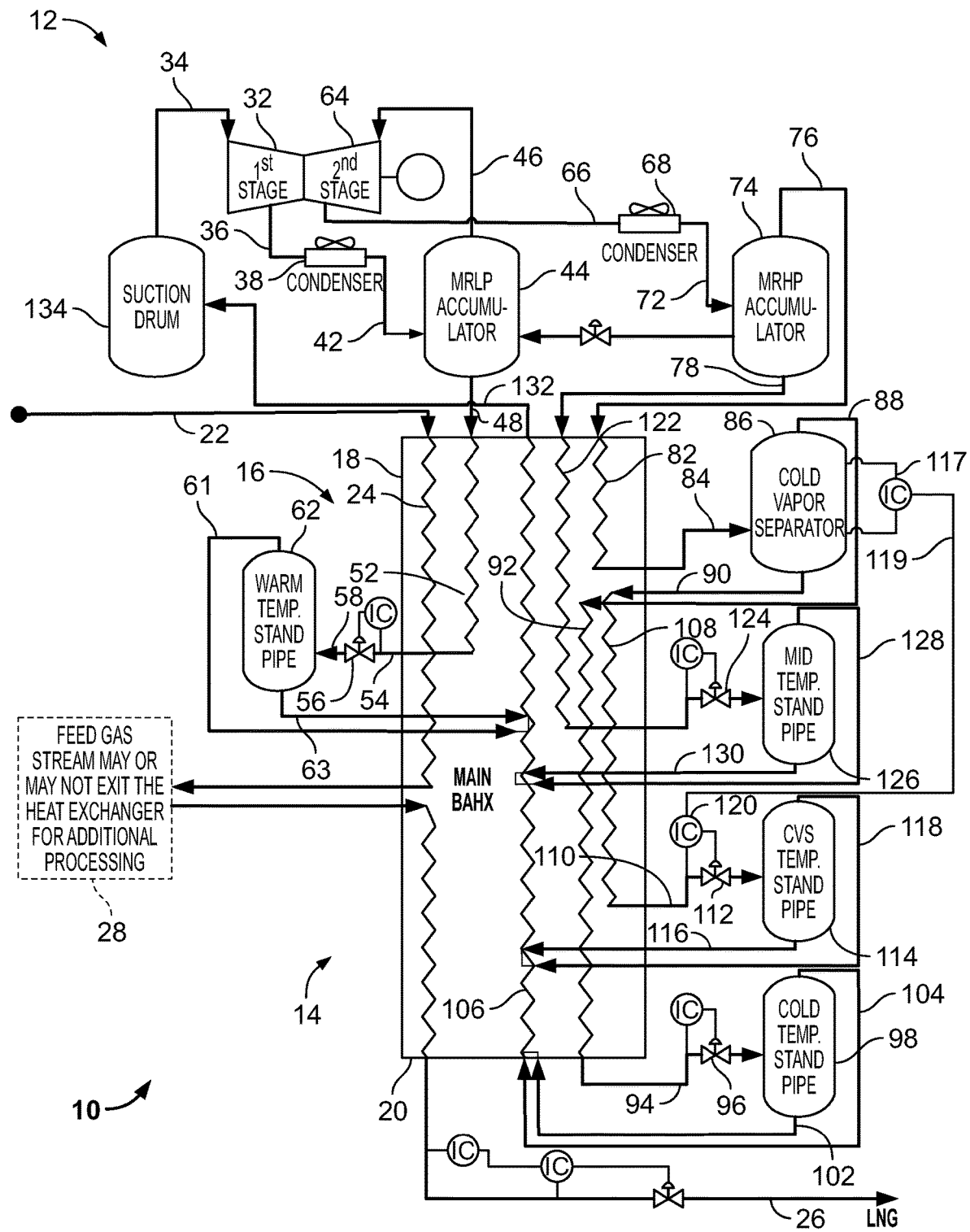
FIG. 1 is a process flow diagram and schematic illustrating a first embodiment of the process and system of the disclosure.

A first embodiment of a mixed refrigerant liquefaction system is indicated in general at 10 in FIG. 1. The system includes a compression system, indicated in general at 12, and a heat exchanger system, indicated in general at 14. The removal of heat is accomplished in the heat exchanger system 14 using a mixed refrigerant that is processed and reconditioned using the compression system 12.

It should be noted herein that the passages and streams are sometimes both referred to by the same element number set out in the figures. Also, as used herein, and as known in the art, a heat exchanger is that device or an area in the device wherein indirect heat exchange occurs between two or more streams at different temperatures, or between a stream and the environment. As used herein, the terms "communication", "communicating", and the like generally refer to fluid communication unless otherwise specified. Furthermore, although two fluids in communication may exchange heat upon mixing, such an exchange would not be considered to be the same as heat exchange in a heat exchanger, although such an exchange can take place in a heat exchanger. As used herein, the term "reducing the pressure of" (or variations thereof) does not involve a phase change, while the term "flashing" (or variations thereof) involves a phase change, including even a partial phase change. As used herein, the terms, "high", "middle", "warm" and the like are relative to comparable streams, as is customary in the art.

The heat exchanger system includes a multi-stream heat exchanger, indicated in general at 16, having a warm end 18 and a cold end 20. The heat exchanger receives a high pressure natural gas feed stream 22 that is liquefied in cooling passage 24 via removal of heat via heat exchange with refrigeration streams in the heat exchanger. As a result, a stream 26 of liquid natural gas product is produced. The multi-stream design of the heat exchanger allows for convenient and energy-efficient integration of several streams into a single exchanger. Suitable heat exchangers may be purchased from Chart Energy & Chemicals, Inc. of The Woodlands, Texas. The brazed aluminum plate and fin multi-stream heat exchanger available from Chart Energy & Chemicals, Inc. offers the further advantage of being physically compact.

The system of FIG. 1, including heat exchanger 16, may be configured to perform other gas processing options, indicated in phantom at 28, known in the prior art. These processing options may require the gas stream to exit and reenter the heat exchanger one or more times and may include, for example, natural gas liquids recovery or nitrogen rejection. Furthermore, while embodiments are described below in terms of liquefaction of natural gas, they may be used for the cooling, liquefaction and/or processing of gases other than natural gas including, but not limited to, air or nitrogen.

With reference to the compression system 12, the first stage 32 of a compressor receives a vapor mixed refrigerant stream 34 and compresses it. The resulting stream 36 then travels to a first stage after-cooler 38 where it is cooled and partially condensed. The resulting mixed phase refrigerant stream 42 travels to a low pressure accumulator 44 and is separated into a vapor stream 46 and high-boiling refrigerant liquid stream 48. While an accumulator drum is illustrated as the low pressure accumulator 44, alternative separation devices may be used, including, but not limited to, a standpipe or another type of vessel, a cyclonic separator, a distillation unit, a coalescing separator or mesh or vane type mist eliminator. This applies for all accumulators, separators, separation devices and standpipes referenced below.

Vapor stream 46 travels from the vapor outlet of low pressure accumulator 44 to the second stage 64 of the compressor where it is compressed to a high pressure. Stream 66 exits the compressor second stage and travels through a second or last stage after-cooler 68 where it is cooled. The resulting stream 72 contains both vapor and liquid phases which are separated in high pressure accumulator 74 to form high pressure vapor stream 76 and high pressure or mid-boiling refrigerant liquid stream 78.

While the first and second compressor stages are illustrated as part of a single compressor, individual compressors may be used instead. In addition, the system is not limited to solely two compression and cooling stages in that more or less may be used.

Turning to the heat exchanger system 14, the heat exchanger 16 includes a high pressure vapor passage 82 which receives the high pressure vapor stream 76 from the high pressure accumulator 74 and cools it so that it is partially condensed. The resulting mixed phase cold separator feed stream 84 is provided to a cold vapor separator 86 so that cold separator vapor stream 88 and cold separator liquid stream 90 are produced.

The heat exchanger 16 includes a cold separator vapor passage 92 that receives the cold separator vapor stream 88. The cold separator vapor stream is cooled in passage 92 and condensed into liquid stream 94, flashed through expansion device 96 and directed to cold temperature separator 98 to form a cold temperature liquid stream 102 and a cold temperature vapor stream 104. As in the case of all expansion devices referenced below, expansion device 96 may be an expansion valve, such as a Joule-Thomson valve, or another type of expansion device including, but not limited to, a turbine or an orifice. The cold temperature liquid and vapor streams are combined (within the heat exchanger, within a header of the heat exchanger or prior to entry into a header of the heat exchanger) and directed to the heat exchanger's primary refrigeration passage 106 to provide cooling.

The cold separator liquid stream 90 is cooled in a cold separator liquid passage 108 to form subcooled cold separator liquid 110, which is flashed at 112 and directed to CVS temperature separator 114. A resulting CVS temperature liquid stream 116 and a resulting CVS vapor stream 118 are combined (within the heat exchanger, within a header of the heat exchanger or prior to entry into a header of the heat exchanger) and directed to the heat exchanger's primary refrigeration passage 106 to provide cooling. In such an arrangement, the CVS temperature separator 114 improves thermodynamic and fluid distribution performance.

A liquid level detector or sensor, indicated at 117 in FIG. 1, determines the liquid level within the cold vapor separator 86 and transmit this data via line 119 to valve controller 120, which controls operation of valve 112. The valve controller 120 is programmed to open valve 112 further when the liquid level within the cold vapor separator 86 rises above a predetermined level. As a result, the CVS temperature separator 114 permits the liquid level within the cold vapor separator 86 to be regulated or controlled.

The mid-boiling refrigerant liquid stream 78 is directed from the high pressure accumulator 74 through a high pressure liquid passage 122 of the heat exchanger, subcooled and then flashed using expansion device 124 and directed to middle temperature standpipe 126 to form the middle temperature refrigerant vapor stream 128 and middle temperature liquid stream 130 which are combined (within the heat exchanger, within a header of the heat exchanger or prior to entry into a header of the heat exchanger) and directed to the heat exchanger's primary refrigeration passage 106 to provide cooling.

The liquid stream 48 exiting the low pressure accumulator 44, which is warm and a heavy fraction of the mixed refrigerant, enters a pre-cool liquid passage 52 of heat exchanger 16 and is subcooled. The resulting subcooled high-boiling stream 54 exits the heat exchanger and is flashed through expansion device 56 and directed to warm temperature standpipe 62. As a result, a warm temperature refrigerant vapor stream 61 and warm temperature liquid stream 63 are formed and then combined (within the heat exchanger, within a header of the heat exchanger or prior to entry into a header of the heat exchanger) and directed to the heat exchanger's primary refrigeration passage 106 to provide cooling.

The combined refrigerant streams from the warm temperature standpipe 62, the mid temperature standpipe 126, the CVS temperature standpipe 114 and the cold temperature standpipe 98 exit the primary refrigeration passage 106 as a combined return refrigerant stream 132, which preferably is in the vapor phase. The return refrigerant stream 132 flows to an optional suction drum 134, which results in vapor mixed refrigerant stream 34, referenced previously. As is known in the art, the optional suction drum 134 guards against liquid being delivered to the system compressor.

In the embodiment of the system presented in FIG. 1, instead of mixing the liquid from the cold vapor separator 86 with the liquid from the high pressure mixed refrigerant accumulator 74 before entering the heat exchanger, as in, for example, U.S. Patent Application Publication No. US 2014/0260415 to Ducote, Jr. et al., the liquids are introduced into the heat exchanger separately. Furthermore, liquid streams from the cold vapor separator and high pressure mixed refrigerant accumulator are introduced separately from corresponding vapor streams after the initial individual liquid streams are cooled and then flashed by respective expansion devices. This provides the advantage of proper vapor and liquid distribution for the heat exchanger, which is particularly important for brazed aluminum heat exchangers (BAHX), especially where multiple BAHXs are used in parallel. Furthermore, it has been found by the inventors that the system of FIG. 1 results in slight efficiency increases as compared to designs where liquid from the cold vapor separator and high pressure mixed refrigerant accumulator are mixed before entering the heat exchanger.

The configuration illustrated in FIG. 1 may be varied to reduce cost and complexity for various sized liquid natural gas plants. For example, in an alternative embodiment presented in FIG. 2, the warm temperature standpipe 62 of FIG. 1 is omitted. The liquid stream 248 exiting the low pressure accumulator 244, which is warm and a heavy fraction of the mixed refrigerant, enters a pre-cool liquid passage 252 of heat exchanger 216 and is subcooled. The resulting subcooled high-boiling stream 254 exits the heat exchanger and is reduced in pressure or flashed through expansion device 256. The resulting refrigerant stream 258 is directed to the heat exchanger's primary refrigeration passage 206 to provide cooling.

The remaining portion and corresponding components of the system of FIG. 2, as in the case of the systems of FIGS. 3-6 with the exceptions described below, are the same, and operate in the same manner, as described above for the system of FIG. 1.

Figure 3:
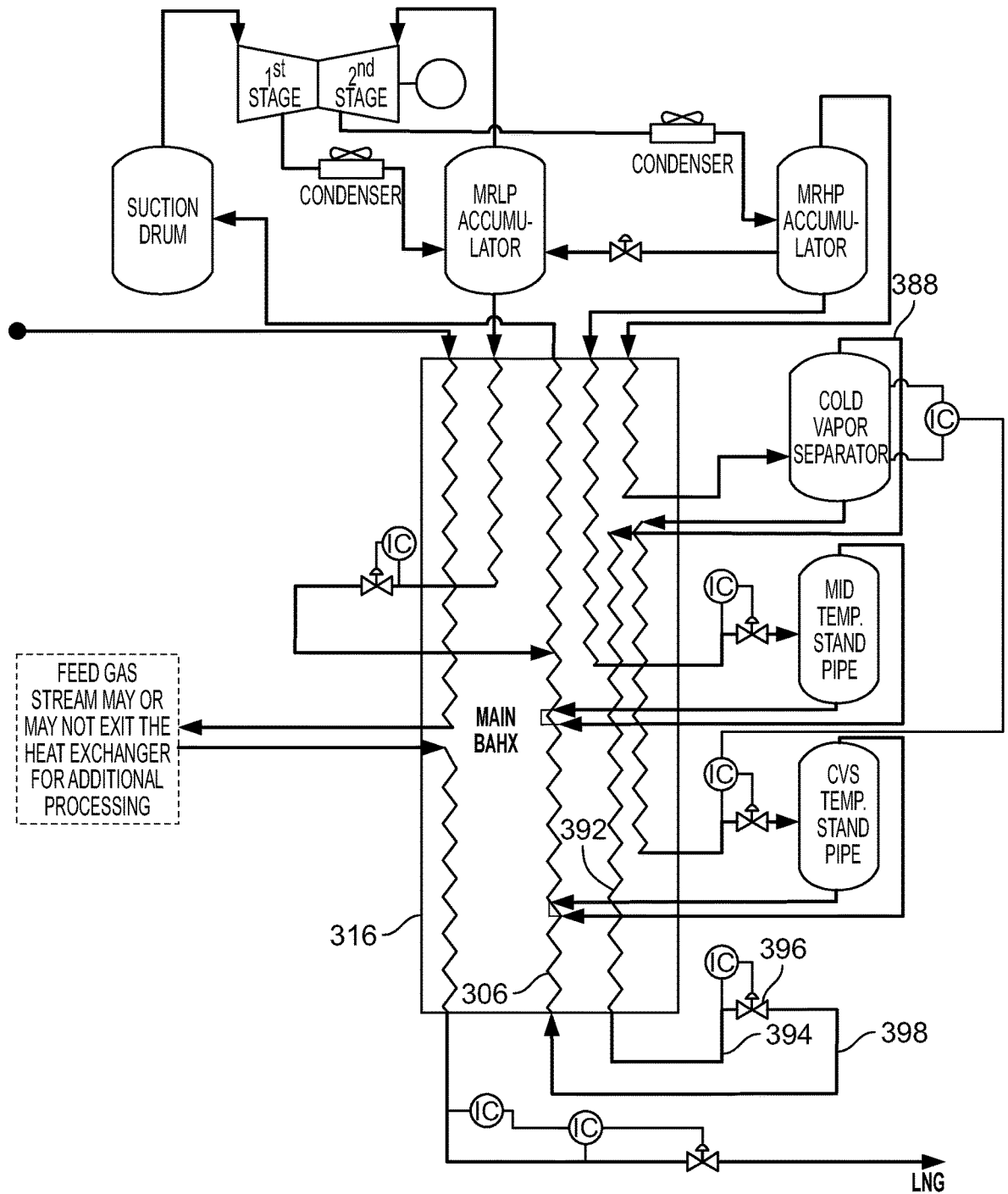
FIG. 3 is a process flow diagram and schematic illustrating a third embodiment of the process and system of the disclosure.

In another embodiment, illustrated in FIG. 3, the cold temperature standpipe 98 (as well as the warm temperature standpipe 62) of FIG. 1 is omitted. The heat exchanger 316 includes a cold separator vapor passage 392 that receives the cold separator vapor stream 388. The cold separator vapor stream is cooled in passage 392 and condensed into liquid stream 394, reduced in pressure or flashed through expansion device 396 and the resulting refrigerant stream 398 directed to the heat exchanger's primary refrigeration passage 306 to provide cooling.

Figure 2:
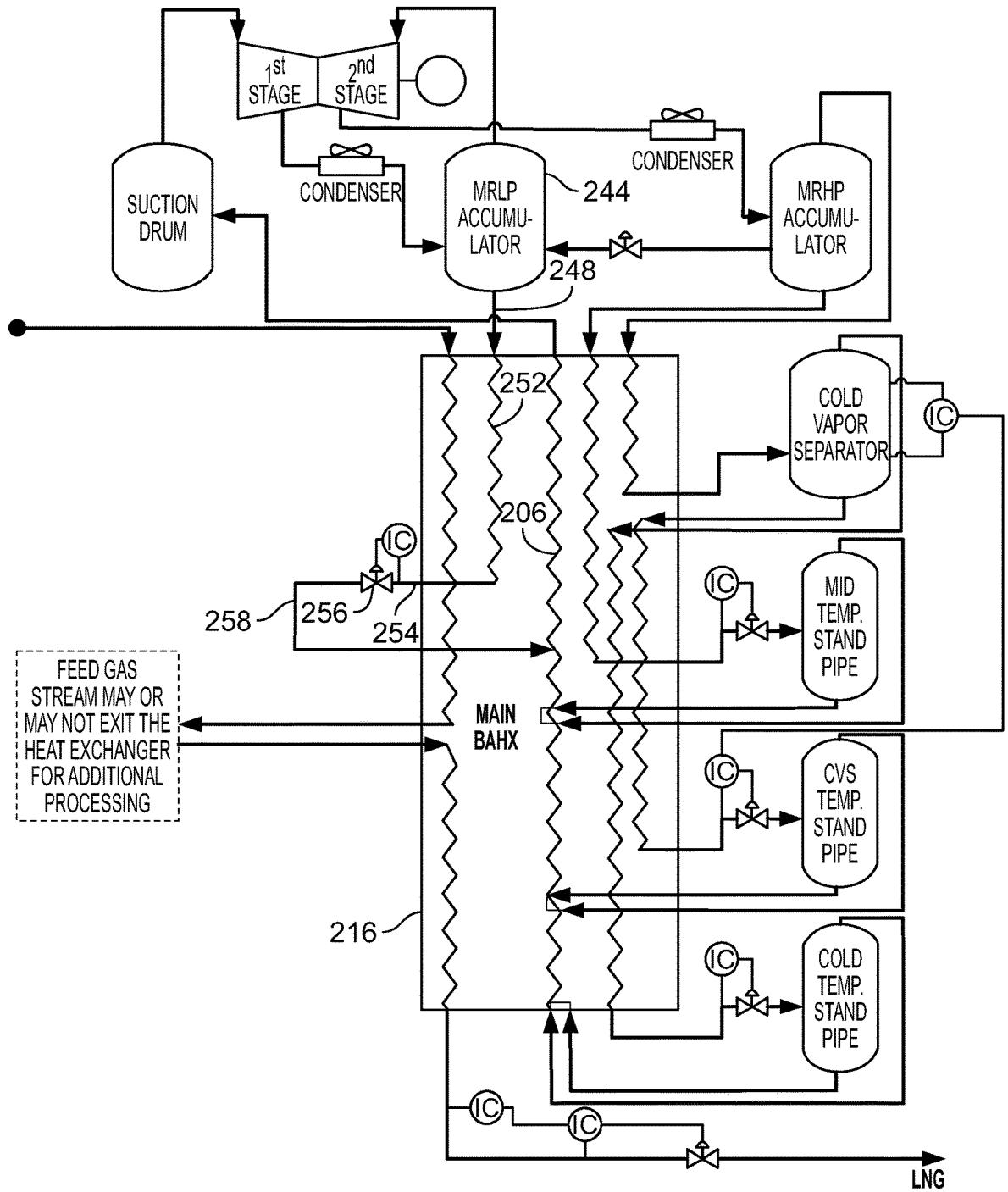
FIG. 2 is a process flow diagram and schematic illustrating a second embodiment of the process and system of the disclosure.
Figure 4:
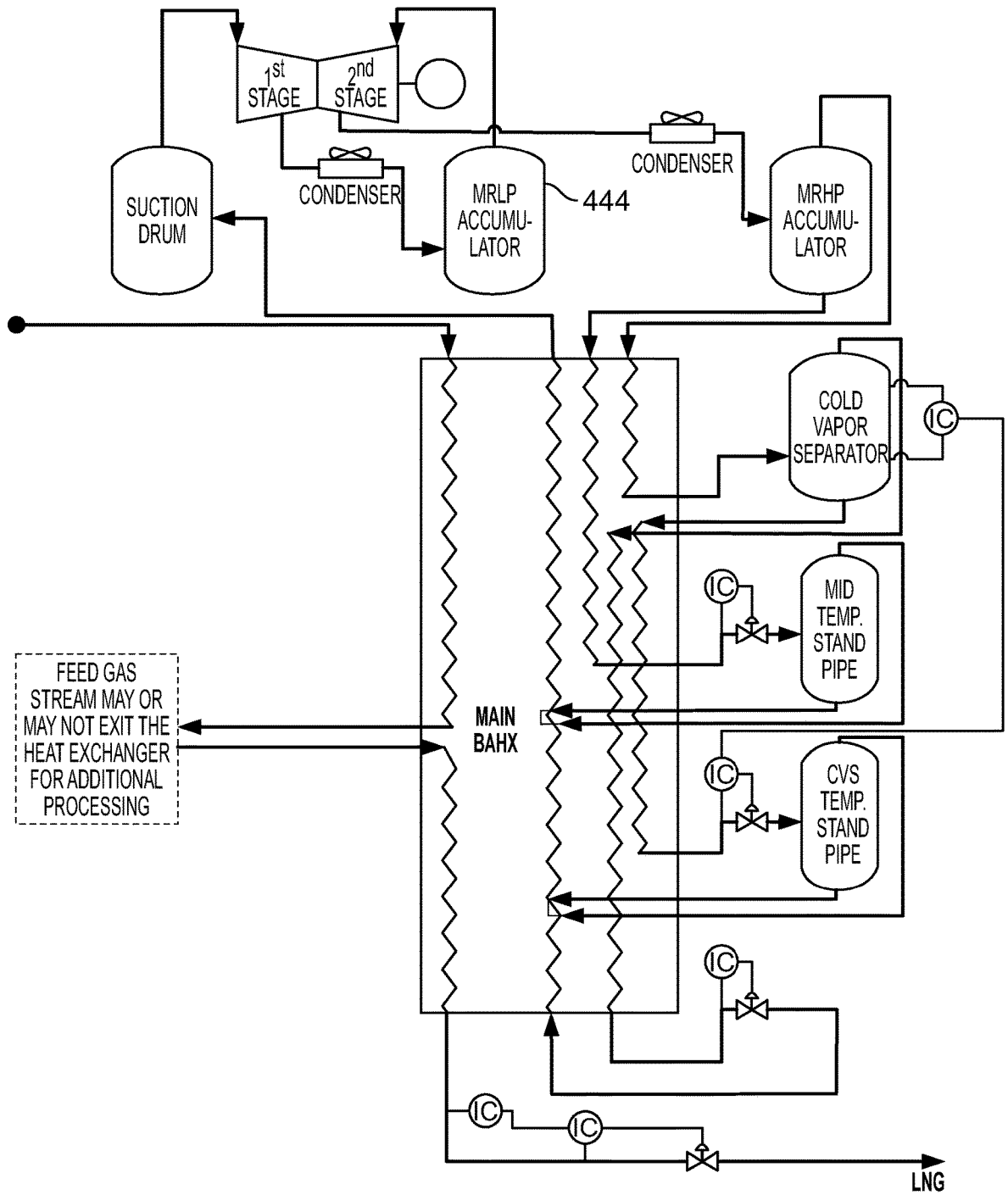
FIG. 4 is a process flow diagram and schematic illustrating a fourth embodiment of the process and system of the disclosure.

As illustrated in FIG. 4, and in contrast to the systems of FIGS. 1-3, alternative embodiments of the system may be configured to operate without use of low pressure refrigerant from the low pressure accumulator 444.

Figure 5:
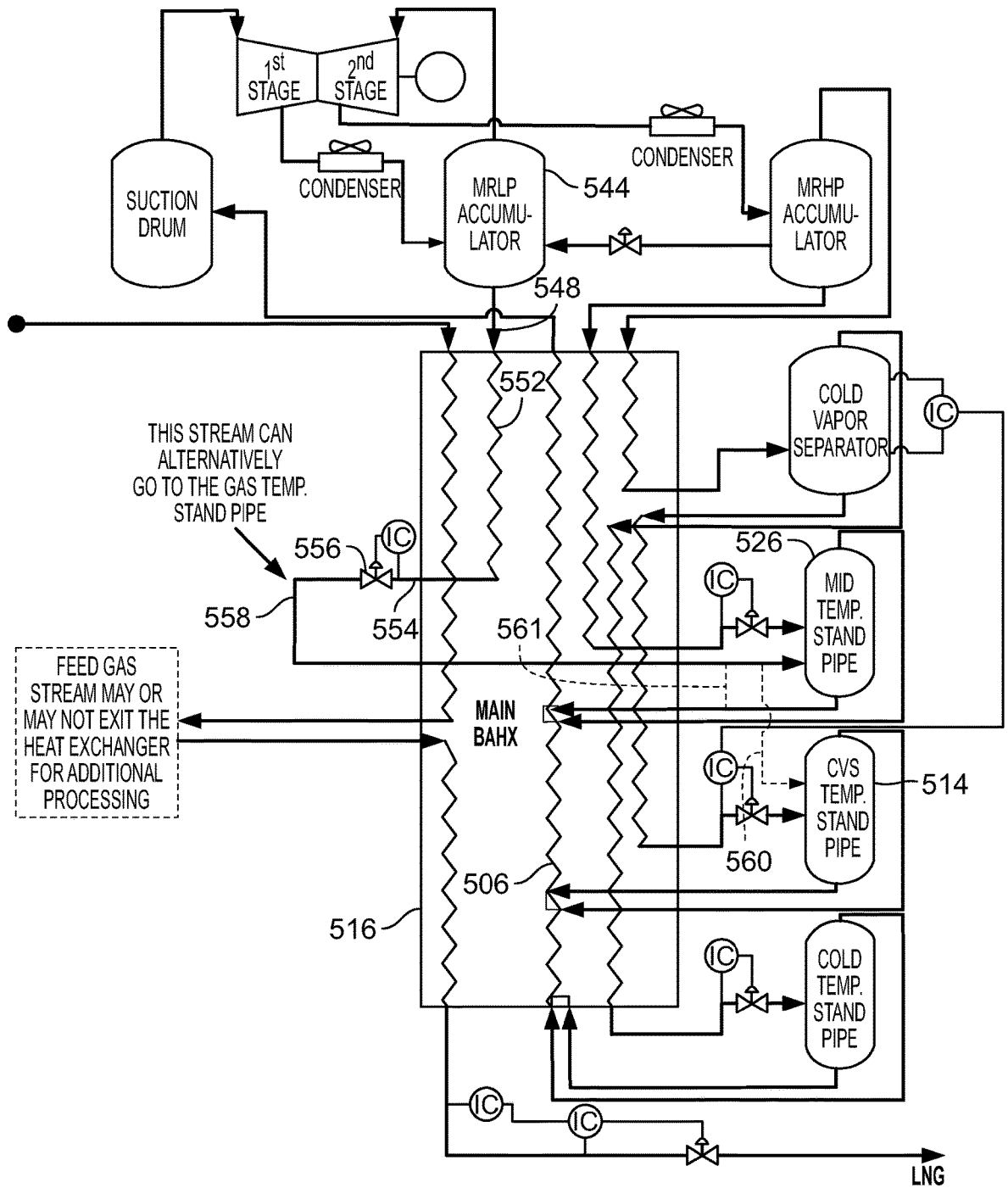
FIG. 5 is a process flow diagram and schematic illustrating a fifth embodiment of the process and system of the disclosure.

In another alternate configuration, illustrated in FIG. 5, the liquid refrigerant stream from the low pressure accumulator is sent to either the middle temperature standpipe 526 or the CVS temperature standpipe 514, instead of entering the heat exchanger separately. More specifically, with reference to FIG. 5, the liquid stream 548 exiting the low pressure accumulator 544, which is warm and a heavy fraction of the mixed refrigerant, enters a pre-cool liquid passage 552 of heat exchanger 516 and is subcooled. The resulting subcooled high-boiling stream 554 exits the heat exchanger and is reduced in pressure or flashed through expansion device 556. The resulting refrigerant stream 558 is directed to the middle temperature standpipe 526. Alternatively, or in addition, as indicated in phantom at 560, the refrigerant stream exiting the expansion device 556 may be routed to the CVS temperature standpipe 514. As a further alternative, as indicated in phantom at 561 in FIG. 5, a portion, or all, of the refrigerant stream 558 may be routed to the primary refrigeration passage 506.

The system and process of FIG. 5 reduces the number of injection points into the primary refrigeration passage 506 of the heat exchanger 516. Given that each injection point into the primary refrigeration passage causes a pressure drop in the passage, reducing the number of injection points reduces power consumption of the system and thus increases operational efficiency. In addition, manufacturing of the heat exchanger is simplified, which reduces equipment cost.

Figure 6:
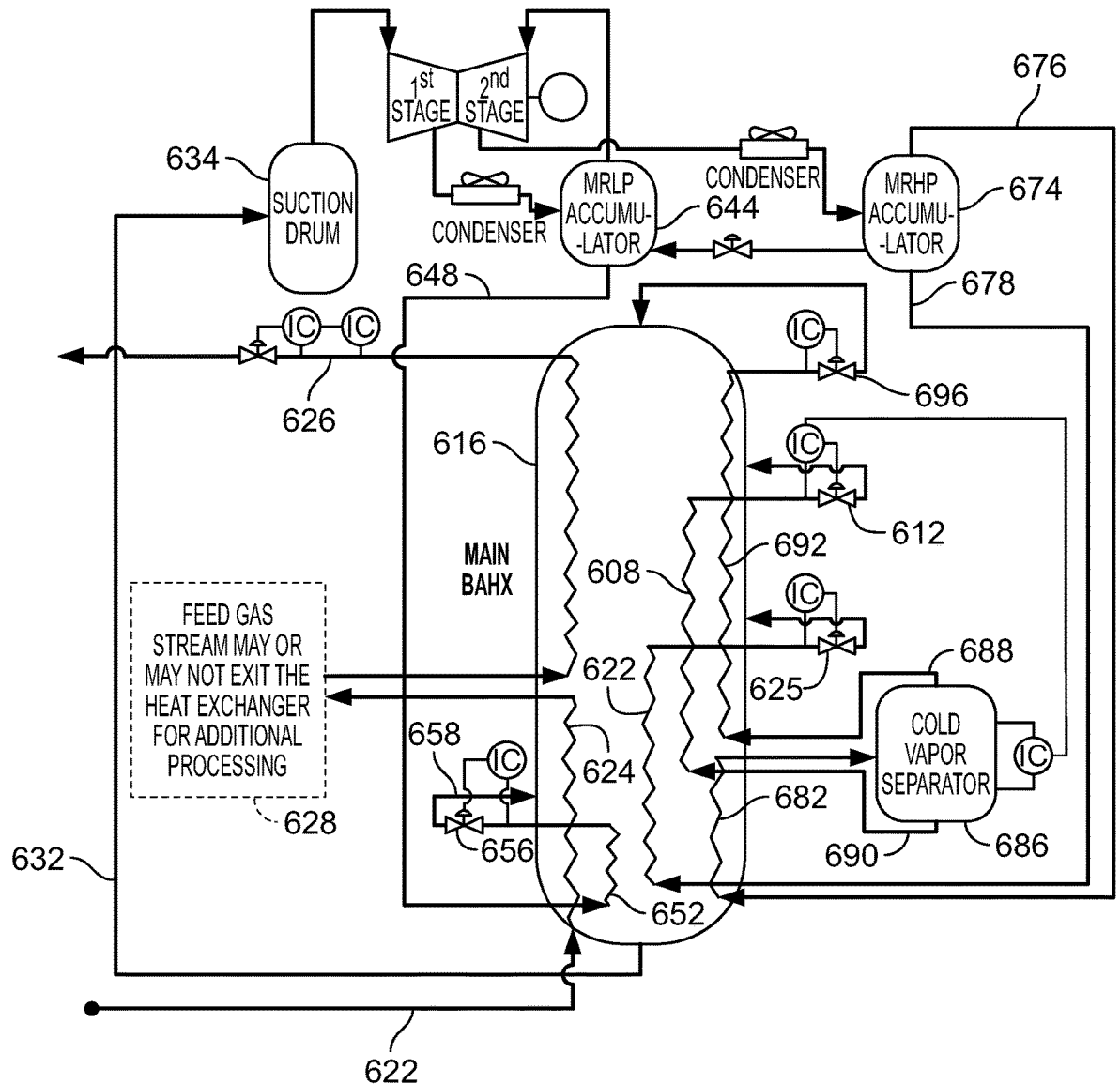
FIG. 6 is a process flow diagram and schematic illustrating a sixth embodiment of the process and system of the disclosure.

In another alternate configuration, illustrated in FIG. 6, a core and kettle or shell and tube heat exchanger 616 is used to liquefy a natural gas feed stream 622 via passage 624 so that a liquid natural gas product stream 626 is formed. As in the previous embodiments, the system of FIG. 6, including heat exchanger 616, may be configured to perform other gas processing options, indicated in phantom at 628, known in the prior art. These processing options may require the gas stream to exit and reenter the heat exchanger one or more times and may include, for example, natural gas liquids recovery or nitrogen rejection.

In the embodiment of FIG. 6, the liquid stream 648 exiting the low pressure accumulator 644, which is warm and a heavy fraction of the mixed refrigerant, enters a pre-cool liquid passage 652 of heat exchanger 616 and is subcooled. The resulting subcooled high-boiling stream exits the heat exchanger and is reduced in pressure or flashed through expansion device 656, and the resulting refrigerant stream 658 is directed to the kettle or shell of the heat exchanger 616 to provide cooling.

The heat exchanger 616 includes a high pressure vapor passage 682 which receives the high pressure vapor stream 676 from the high pressure accumulator 674 and cools it so that it is partially condensed. The resulting mixed phase cold separator feed stream is provided to a cold vapor separator 686 so that cold separator vapor stream 688 and cold separator liquid stream 690 are produced.

The heat exchanger 616 includes a cold separator vapor passage 692 that receives the cold separator vapor stream 688. The cold separator vapor stream is cooled in passage 692 and condensed, flashed through expansion device 696 and directed to the top of the kettle or shell of the heat exchanger 616 to provide cooling.

The cold separator liquid stream 690 is cooled in a cold separator liquid passage 608 to form a subcooled cold separator liquid stream, which is flashed at 612 and directed the kettle or shell of the heat exchanger 616 to provide cooling.

The mid-boiling refrigerant liquid stream 678 is directed from the high pressure accumulator 674 through a high pressure liquid passage 622 of the heat exchanger, subcooled and is then flashed using expansion device 625 and directed to the kettle or shell of the heat exchanger 616 to provide cooling Each of the refrigerant streams directed to the kettle or shell of the heat exchanger 616 of FIG. 6 to provide cooling enters a spray bar or other distribution device positioned within the interior of the kettle or shell. After the streams cascade down through the interior of the kettle or shell over the core or tubes (containing the passages described above) to provide cooling, they combine and exit the bottom of the heat exchanger 616 and travel to an optional suction drum 634 of the compression system as a refrigerant return stream 632.

Figure 7:
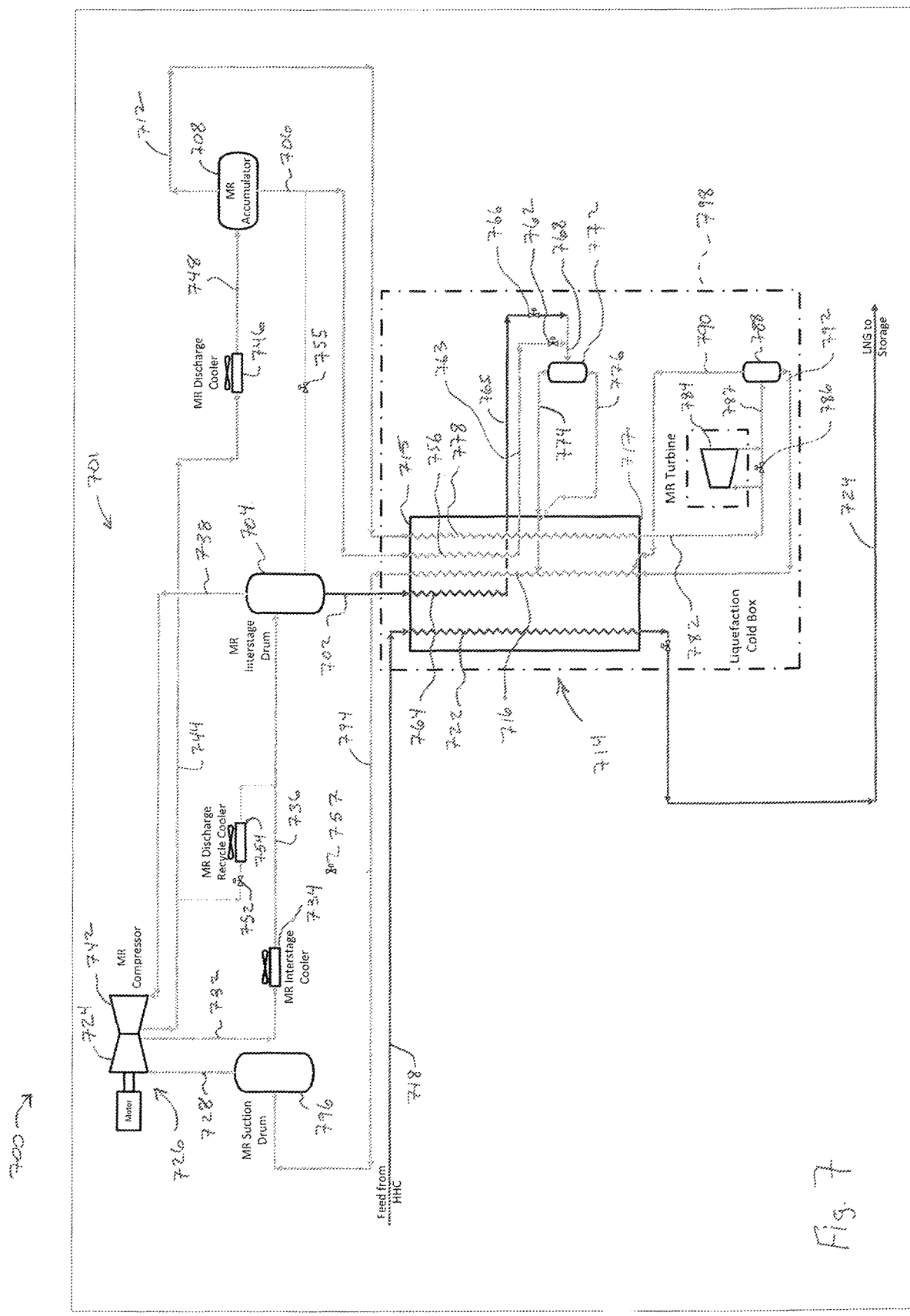
FIG. 7 is a process flow diagram and schematic illustrating a seventh embodiment of the disclosure.

In an alternative embodiment of the system of the disclosure, indicated in general at 700 in FIG. 7, a mixed refrigerant compression system, indicated in general at 701, provides a liquid refrigerant stream 702 from the liquid side of a low pressure accumulator or interstage separation device 704, a liquid refrigerant stream 706 from the liquid side of a high pressure accumulator 708 and a vapor refrigerant stream 712 provided from the vapor side of the high pressure accumulator. As explained in greater detail below, refrigerant streams 702, 706 and 712 are routed to a liquefier heat exchanger, indicated in general at 714, which as an example only may be a brazed aluminum heat exchanger (BAHX), for cooling, after which they are expanded and distributed to a shared low pressure refrigerant passage 716 in the liquefier heat exchanger to provide the cooling duty for the process. The liquefier heat exchanger 714 includes a warm end 715 and a cold end 717.

Notably, in the embodiment of FIG. 7, the vapor refrigerant stream 712 from the high pressure accumulator 708 is cooled in, and sent to the cold end 717 of, the liquefier heat exchanger 714, without separating it in a cold vapor separator. The resulting liquid mixed refrigerant stream is expanded in total or in part with a liquid turbine with a remaining (or no) portion expanded in a flashing control valve to provide additional cooling at the heat exchanger cold end. In addition, in the embodiment of FIG. 7, a common warm or middle temperature standpipe receives streams that originated as the interstage liquid stream and the high pressure accumulator liquid stream after subcooling, expansion and combination.

It should be noted that while a single liquefier heat exchanger 714 is illustrated in FIG. 7, the single liquefier heat exchanger may instead include multiple separate heat exchangers that collectively form the liquefier heat exchanger 714.

With continued reference to FIG. 7, a natural gas stream 718 is directed to a cooling passage 722 of the liquefier heat exchanger 714 wherein it is cooled and liquefied. As a result a liquid natural gas stream 724 is formed and may be directed to storage, as an example only. As an example only, the natural gas stream 718 may be received by the liquefier heat exchanger 714 from a heavy hydrocarbon removal system.

With reference to the compression system 701, the first stage 724 of a compressor, indicated in general at 726, receives a vapor mixed refrigerant stream 728 and compresses it. The resulting stream 732 then travels to a first stage after-cooler 734 where it is cooled and partially condensed. The resulting mixed phase refrigerant stream 736 travels to the interstage separation device 704 and is separated into a vapor stream 738 and high-boiling refrigerant liquid stream 702. While an accumulator drum is illustrated as the interstage separation device 704, alternative separation devices may be used, including, but not limited to, a standpipe or another type of vessel, a cyclonic separator, a distillation unit, a coalescing separator or mesh or vane type mist eliminator. This applies for all accumulators, separators, separation devices and standpipes referenced below.

Vapor stream 738 travels from the vapor outlet of low pressure accumulator 704 to the second stage 742 of the compressor 726 where it is compressed to a high pressure. Stream 744 exits the compressor second stage and travels through a second or last stage after-cooler 746 where it is cooled. The resulting stream 748 contains both vapor and liquid phases which are separated in the high pressure accumulator 708 to form high pressure vapor stream 712 and high pressure or mid-boiling refrigerant liquid stream 706.

A portion of the stream 744 exiting the second stage 742 of the compressor may be directed, based on the setting of control valve 752, through a recycle after-cooler 754. The resulting cooled mixed refrigerant stream joins stream 736. This permits additional mixed refrigerant to be directed to the interstage separation device 704 so as to increase cooling in the warm end 715 of the liquefier heat exchanger 714 if desired. Recycle valves 755 and 757 also permit portions of mixed refrigerant streams to be diverted from or directed to the interstage separation device to decrease or increase cooling in the warm end 715 of the heat exchanger.

While the first and second compressor stages 724 and 742 are illustrated as part of a single compressor 726 in FIG. 7, individual compressors may be used instead. In addition, the system is not limited to solely two compression and cooling stages in that more or less may be used.

The mid-boiling refrigerant liquid stream 706 is directed from the high pressure accumulator 708 through a high pressure liquid passage 756 of the heat exchanger so as to form subcooled stream 763 which is then subcooled and then flashed using expansion device 762.

The high-boiling refrigerant liquid stream 702, which is warm and a heavy fraction of the mixed refrigerant, is directed from the interstage separation device 704 through a pre-cool liquid passage 764 of the heat exchanger so as to form subcooled stream 765 which is then flashed using expansion device 766.

The streams exiting expansion devices 762 and 766 are combined to form combined middle temperature stream 768, which is directed to a middle temperature standpipe 772 to form a middle temperature refrigerant vapor stream 774 and a middle temperature liquid stream 776 which are combined (within the heat exchanger, within a header of the heat exchanger or prior to entry into a header of the heat exchanger) and directed to the heat exchanger's primary refrigeration passage 716 to provide cooling within the liquefier heat exchanger 714.

Expansion devices 762 and 766 also serve as flow control valves to control the proportions of the corresponding streams combined to form middle temperature stream 768.

In alternative embodiments, the streams exiting expansion devices 762 and 766 may be individually directed to the middle temperature standpipe 772 without being combined beforehand. In further alternative embodiments, streams 763 and 765 may be combined with the resulting combined stream directed to a single expansion device with the resulting single expanded mixed phase stream directed to the middle temperature standpipe 772.

Liquefier heat exchanger 714 also includes a high pressure vapor passage 778 which receives the high pressure vapor stream 712 from the high pressure accumulator 708 and cools it so that it is partially condensed. The resulting mixed phase cold separator feed stream 782 is provided to a liquid mixed refrigerant turbine 784 and/or a flashing flow control valve 786. Flashing control valve 786 may be set to direct selected portions of stream 782 through the liquid turbine 784 and the flashing control valve or all of stream 782 through the liquid turbine 784. The resulting combined cold mixed phase stream or cold mixed phase stream 787 is directed to a cold temperature standpipe 788 to form a cold temperature refrigerant vapor stream 790 and a cold temperature liquid stream 792 which are combined (within the heat exchanger, within a header of the heat exchanger or prior to entry into a header of the heat exchanger) and directed to the heat exchanger's primary refrigeration passage 716 to provide cooling within the liquefier heat exchanger 714.

The combined refrigerant streams from the middle temperature standpipe 772 and the cold temperature standpipe 788 exit the primary refrigeration passage 716 of the liquefier heat exchanger 714 as a combined return refrigerant stream 794, which preferably is in the vapor phase. The return refrigerant stream 794 flows to an optional suction drum 796, which results in vapor mixed refrigerant stream 728, referenced previously. As is known in the art, the optional suction drum 796 guards against liquid being delivered to the system compressor(s).

The liquefier heat exchanger 714, middle temperature standpipe 772, cold temperature standpipe 288 and related piping and components may be positioned within a cold box 798 for insulation from ambient temperatures. Such cold boxes 798 are well known in the art.

The system 700 of FIG. 7 may provide unexpected optimization yielded by the lack of the cold vapor separator of FIGS. 1-6. The lack of a cold vapor separator means that richer refrigerant (i.e. higher boiling point refrigerant) is routed to the cold end 717 of liquefier heat exchanger 714 to serve the coldest refrigerant service. In normal circumstances, the increased richness would require a lower pressure in the low pressure refrigerant pass, decreasing efficiency, but, in this case, the impact of that richness is more than countered by the increase in energy extraction from the cold end mixed refrigerant liquid turbine 784 brought about by routing the full vapor flow from the high pressure accumulator 708 to the turbine, allowing the use of a higher, more efficient low pressure refrigerant pass operating pressure than would be achievable in designs that lack both a cold vapor separator and the cold end mixed refrigerant liquid turbine 784.

The increased richness of the coldest refrigerant service also means the other refrigerant services that ultimately provide the duty required to condense this stream do not need to provide that refrigeration at as low of a temperature. This means that the high pressure accumulator liquid stream 706 can be cooled far less than may otherwise be needed, allowing it to be at an appropriate temperature for the interstage separation device liquid stream 702 to be efficiently routed to the middle temperature standpipe 772.

While the preferred embodiments of the invention have been shown and described, it will be apparent to those skilled in the art that changes and modifications may be made therein without departing from the spirit of the invention, the scope of which is defined by the appended claims.

What is claimed is:

1. A system for cooling a gas with a mixed refrigerant comprising:
    a) a heat exchanger including a cooling passage having an inlet configured to receive a feed of the gas and an outlet through which a product exits said heat exchanger, said heat exchanger also including a primary refrigeration passage, a pre-cool liquid passage, a high pressure vapor passage and a high pressure liquid passage;
    b) a first stage compression device having an inlet in fluid communication with an outlet of the primary refrigeration passage;
    c) a first stage after-cooler having an inlet in fluid communication with the outlet of the first stage compression device and an outlet;
    d) a low pressure accumulator having an inlet in fluid communication with the outlet of the first stage after-cooler and having a liquid outlet in fluid communication with the pre-cool liquid passage of the heat exchanger and a vapor outlet;
    e) a second stage compression device having an inlet in fluid communication with the vapor outlet of the low pressure accumulator and an outlet;
    f) a second stage after-cooler having an inlet in fluid communication with the outlet of the second stage compression device and an outlet;
    g) a high pressure accumulator having an inlet in fluid communication with the outlet of the second stage after-cooler and having a liquid outlet in fluid communication with the high pressure liquid passage of the heat exchanger and a vapor outlet in fluid communication with the high pressure vapor passage of the heat exchanger;
    h) a liquid turbine having a liquid turbine inlet in fluid communication with the high pressure vapor passage of the heat exchanger and a liquid turbine outlet;
    i) a middle temperature separation device having an inlet, a vapor outlet in fluid communication with the primary refrigeration passage and a liquid outlet in fluid communication with the primary refrigeration passage;
    j) a first expansion device having an inlet in fluid communication with the high pressure liquid passage of the heat exchanger and an outlet in fluid communication with the middle temperature separation device;
    k) a second expansion device having an inlet in fluid communication with the pre-cool liquid passage of the heat exchanger and an outlet in fluid communication with the middle temperature separation device;
    l) a cold temperature separation device having an inlet in fluid communication with the liquid turbine outlet, a vapor outlet in fluid communication with the primary refrigeration passage and a liquid outlet in fluid communication with the primary refrigeration passage.

2. The system of claim 1 further comprising a third expansion device configured in parallel with the liquid turbine so that a first portion of a mixed refrigerant stream exiting the high pressure vapor passage of the heat exchanger is directed through the liquid turbine and a second portion of the mixed refrigerant stream exiting the high pressure vapor passage of the heat exchange is directed through the third expansion device and an outlet of the third expansion device and the liquid turbine outlet are in fluid communication with the cold temperature separation device.

3. The system of claim 2 wherein mixed refrigerant streams exiting the third expansion device outlet and the liquid turbine outlet are combined so that a combined cold mixed phase stream is formed and directed to the cold temperature separation device.

4. The system of claim 2 wherein the third expansion device is an expansion valve.

5. The system of claim 3 wherein the expansion valve is a flashing flow control valve having a flashing flow control valve outlet.

6. The system of claim 5 wherein mixed refrigerant streams exiting the flashing flow control valve outlet and the liquid turbine outlet are combined so that a combined cold mixed phase stream is formed and directed to the cold temperature separation device.

7. The system of claim 1 wherein the first and second compression stages are stages of a single compressor.

8. The system of claim 1 wherein the middle temperature separation device and the cold temperature separation device are both standpipes.

9. The system of claim 1 wherein mixed refrigerant streams exiting the first and second expansion device outlets are combined so that a mixed phase combined middle temperature stream is formed and directed to the middle temperature separation device.

10. A system for cooling a gas with a mixed refrigerant comprising:
    a) a heat exchanger including a cooling passage having an inlet configured to receive a feed of the gas and an outlet through which a product exits said heat exchanger, said heat exchanger also including a primary refrigeration passage, a pre-cool liquid passage, a high pressure vapor passage and a high pressure liquid passage;
    b) a first stage compression device having an inlet in fluid communication with an outlet of the primary refrigeration passage;
    c) a first stage after-cooler having an inlet in fluid communication with the outlet of the first stage compression device and an outlet;
    d) a low pressure accumulator having an inlet in fluid communication with the outlet of the first stage after-cooler and having a liquid outlet in fluid communication with the pre-cool liquid passage of the heat exchanger and a vapor outlet;

e) a second stage compression device having an inlet in fluid communication with the vapor outlet of the low pressure accumulator and an outlet;

f) a second stage after-cooler having an inlet in fluid communication with the outlet of the second stage compression device and an outlet;

g) a high pressure accumulator having an inlet in fluid communication with the outlet of the second stage after-cooler and having a liquid outlet in fluid communication with the high pressure liquid passage of the heat exchanger and a vapor outlet in fluid communication with the high pressure vapor passage of the heat exchanger;

h) a liquid turbine having a liquid turbine inlet in fluid communication with the high pressure vapor passage of the heat exchanger and a liquid turbine outlet;

i) a middle temperature separation device having an inlet in fluid communication with the pre-cool liquid passage of the heat exchanger, a vapor outlet in fluid communication with the primary refrigeration passage and a liquid outlet in fluid communication with the primary refrigeration passage;

j) a first expansion device having an inlet in fluid communication with the high pressure liquid passage of the heat exchanger and an outlet in fluid communication with the middle temperature separation device;

k) a cold temperature separation device having an inlet in fluid communication with the liquid turbine outlet, a vapor outlet in fluid communication with the primary refrigeration passage and a liquid outlet in fluid communication with the primary refrigeration passage.

11. The system of claim 10 further comprising a second expansion device having an inlet in fluid communication with the pre-cool liquid passage of the heat exchanger and an outlet in fluid communication with the middle temperature separation device.

12. The system of claim 11 wherein mixed refrigerant streams exiting the first and second expansion device outlets are combined so that a mixed phase combined middle temperature stream is formed and directed to the middle temperature separation device.

13. The system of claim 10 further comprising a third expansion device configured in parallel with the liquid turbine so that a first portion of a mixed refrigerant stream exiting the high pressure vapor passage of the heat exchanger is directed through the liquid turbine and a second portion of the mixed refrigerant stream exiting the high pressure vapor passage of the heat exchange is directed through the third expansion device and an outlet of the third expansion device and the liquid turbine outlet are in fluid communication with the cold temperature separation device.

14. The system of claim 13 wherein mixed refrigerant streams exiting the third expansion device outlet and the liquid turbine outlet are combined so that a combined cold mixed phase stream is formed and directed to the cold temperature separation device.

15. The system of claim 13 wherein the third expansion device is an expansion valve.

16. The system of claim 15 wherein the expansion valve is a flashing flow control valve having a flashing flow control valve outlet.

17. The system of claim 16 wherein mixed refrigerant streams exiting the flashing flow control valve outlet and the liquid turbine outlet are combined so that a combined cold mixed phase stream is formed and directed to the cold temperature separation device.

18. The system of claim 10 wherein the first and second compression stages are stages of a single compressor.

19. The system of claim 10 wherein the middle temperature separation device and the cold temperature separation device are both standpipes.

20. A system for cooling a gas with a mixed refrigerant comprising:

a) a heat exchanger including a cooling passage having an inlet configured to receive a feed of the gas and an outlet through which a product exits said heat exchanger, said heat exchanger also including a primary refrigeration passage, a pre-cool liquid passage, a high pressure vapor passage and a high pressure liquid passage;

b) a first stage compression device having an inlet in fluid communication with an outlet of the primary refrigeration passage;

c) a first stage after-cooler having an inlet in fluid communication with the outlet of the first stage compression device and an outlet;

d) a low pressure accumulator having an inlet in fluid communication with the outlet of the first stage after-cooler and having a liquid outlet in fluid communication with the pre-cool liquid passage of the heat exchanger and a vapor outlet;

e) a second stage compression device having an inlet in fluid communication with the vapor outlet of the low pressure accumulator and an outlet;

f) a second stage after-cooler having an inlet in fluid communication with the outlet of the second stage compression device and an outlet;

g) a high pressure accumulator having an inlet in fluid communication with the outlet of the second stage after-cooler and having a liquid outlet in fluid communication with the high pressure liquid passage of the heat exchanger and a vapor outlet in fluid communication with the high pressure vapor passage of the heat exchanger;

h) a middle temperature separation device having an inlet, a vapor outlet in fluid communication with the primary refrigeration passage and a liquid outlet in fluid communication with the primary refrigeration passage;

i) a first expansion device having an inlet in fluid communication with the high pressure liquid passage of the heat exchanger and an outlet in fluid communication with the middle temperature separation device;

j) a second expansion device having an inlet in fluid communication with the pre-cool liquid passage of the heat exchanger and an outlet in fluid communication with the middle temperature separation device;

k) a cold temperature separation device having an inlet in fluid communication with the high pressure vapor passage, a vapor outlet in fluid communication with the primary refrigeration passage and a liquid outlet in fluid communication with the primary refrigeration passage.

21. The system of claim 20 wherein mixed refrigerant streams exiting the first and second expansion device outlets are combined so that a mixed phase combined middle temperature stream is formed and directed to the middle temperature separation device.

22. The system of claim 20 wherein the first and second compression stages are stages of a single compressor.

23. The system of claim 20 wherein the middle temperature separation device and the cold temperature separation device are both standpipes.

\* \* \* \* \*